US010013909B2

(12) United States Patent
Wei et al.

(10) Patent No.: US 10,013,909 B2
(45) Date of Patent: Jul. 3, 2018

(54) ARRAY SUBSTRATE, OPTICAL GRATING, DISPLAY PANEL AND DISPLAY DEVICE

(71) Applicant: Boe Technology Group Co., Ltd., Beijing (CN)

(72) Inventors: Wei Wei, Beijing (CN); Naifu Wu, Beijing (CN); Chiachiang Lin, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 179 days.

(21) Appl. No.: 14/785,375

(22) PCT Filed: Apr. 14, 2015

(86) PCT No.: PCT/CN2015/076552
§ 371 (c)(1),
(2) Date: Oct. 19, 2015

(87) PCT Pub. No.: WO2016/070576
PCT Pub. Date: May 12, 2016

(65) Prior Publication Data
US 2016/0358532 A1    Dec. 8, 2016

(30) Foreign Application Priority Data
Nov. 3, 2014    (CN) .......................... 2014 1 0610769

(51) Int. Cl.
*G09G 5/10*    (2006.01)
*G09G 3/20*    (2006.01)
(Continued)

(52) U.S. Cl.
CPC ......... *G09G 3/2092* (2013.01); *G02F 1/1323* (2013.01); *G09G 3/001* (2013.01);
(Continued)

(58) Field of Classification Search
CPC ... G09G 3/3648; G09G 3/3614; G02F 1/1343
(Continued)

(56) References Cited

U.S. PATENT DOCUMENTS

2008/0001874 A1*  1/2008  Seo ................. G06F 21/84
                                                    345/87
2009/0180180 A1*  7/2009  Shimshi .......... G02B 27/2214
                                                    359/462
(Continued)

FOREIGN PATENT DOCUMENTS

CN    201673311          12/2010
CN    201673311 U        12/2010
(Continued)

OTHER PUBLICATIONS

Office Action from CN Application No. 2014106107695 dated Aug. 31, 2016.
(Continued)

*Primary Examiner* — Calvin C Ma
(74) *Attorney, Agent, or Firm* — Calfee, Halter & Griswold LLP (57) ABSTRACT

Embodiments of the present invention provide an array substrate, an optical grating, a display panel and a display device, so as to enable displaying different images in different directions in accordance with the arrangement of subpixels on the array substrate. Moreover, since in one direction only an image corresponding to said direction can be viewed, it would not be influenced by images displayed in other directions. The array substrate comprises a plurality of pixel groups, each pixel group comprises a first category of subpixel group for displaying a preset gray scale and a second category of subpixel group for displaying images of multiple viewpoints; wherein the second category of subpixel group may comprise a first subpixel group, a second subpixel group, a third subpixel group and a fourth subpixel (Continued)

group for displaying a first viewpoint image, a second viewpoint image, a third viewpoint image, and a fourth viewpoint image, respectively; the first subpixel group and the third subpixel group are adjacent to the first category of subpixel group in the vertical direction; the second subpixel group and the fourth subpixel group are adjacent to the first category of subpixel group in the horizontal direction.

20 Claims, 10 Drawing Sheets

(51) Int. Cl.
  *G02F 1/13* (2006.01)
  *G09G 3/00* (2006.01)
  *G02F 1/1343* (2006.01)
(52) U.S. Cl.
  CPC .............. *G09G 3/2074* (2013.01); *G02F 2001/134345* (2013.01); *G09G 2310/027* (2013.01); *G09G 2320/028* (2013.01); *G09G 2320/0209* (2013.01)
(58) Field of Classification Search
  USPC .................. 345/1.1, 87, 690; 359/462, 566
  See application file for complete search history.

(56) References Cited

U.S. PATENT DOCUMENTS

| | | | |
|---|---|---|---|
| 2010/0085517 | A1 | 4/2010 | Hong |
| 2016/0147119 | A1* | 5/2016 | Chang .................. G09G 3/3648 349/33 |

FOREIGN PATENT DOCUMENTS

| | | |
|---|---|---|
| CN | 103313078 | 9/2013 |
| CN | 103313078 A | 9/2013 |
| CN | 104091524 | 10/2014 |
| CN | 104091524 A | 10/2014 |
| CN | 104297962 | 1/2015 |
| CN | 104503116 | 4/2015 |
| CN | 204331201 | 5/2015 |
| CN | 204331201 U | 5/2015 |

OTHER PUBLICATIONS

International Search Report and Written Opinion from PCT/CN15/076552 dated Jul. 31, 2015.

* cited by examiner

ARRAY SUBSTRATE, OPTICAL GRATING, DISPLAY PANEL AND DISPLAY DEVICE

RELATED APPLICATIONS

The present application is the U.S. national phase entry of PCT/CN/2015/076552, FILED Apr. 14, 2015, which claims the benefit of Chinese Patent Application No. 201410610769.5, filed Nov. 3, 2014, the entire disclosures of which are incorporated herein by reference.

FIELD OF THE INVENTION

The present invention relates to the field of image display, in particular to an array substrate, an optical grating, a display panel and a display device.

BACKGROUND OF THE INVENTION

With the popularization of touch tablet computers and constant increase in the function of the tablet computer, the user's requirement on displays becomes higher and higher, in particular in the field of games. The existing tablet computers only allow one image displayed on the panel to be viewed, and cannot enable a user to view different images in different directions. For example, when more than one person play chess or cards using the tablet computer, since different game players cannot see different pictures at the same time, they have to use multiple tablet computers to play the games. It cannot be realized that more than one person play games using one tablet computer.

To conclude, the existing prior art cannot achieve displaying different images in different directions at the same time.

SUMMARY OF THE INVENTION

The embodiments of the present invention provide an array substrate, an optical grating, a display panel and a display device, so as to display different images in different directions according to the arrangement manner of subpixels on the array substrate. Moreover, since in one direction only an image corresponding to said direction can be viewed, it would not be influenced by images displayed in other directions.

An array substrate provided by an embodiment of the present invention comprises a plurality of pixel groups, each pixel group comprises a first category of subpixel group for displaying a preset gray scale and a second category of subpixel group for displaying images of multiple viewpoints, wherein the second category of subpixel group is located around the first category of subpixel group and arranged in different directions.

By means of the arrangement of subpixel groups in the array substrate, when a display device comprising the array substrate is placed on a horizontal plane, different images can be displayed in different directions. Moreover, since in one direction only an image corresponding to said direction can be viewed, it would not be influenced by images displayed in other directions.

In an embodiment, the first category of subpixel group may comprise at least one subpixel unit of the first category.

In an embodiment, the second category of subpixel group may comprise a first subpixel group for displaying a first viewpoint image, a second subpixel group for displaying a second viewpoint image, a third subpixel group for displaying a third viewpoint image, and a fourth subpixel group for displaying a fourth viewpoint image.

In an embodiment, the second category of subpixel group is located around the first category of subpixel group and arranged in different directions. For example, the first subpixel group and the third subpixel group are adjacent to the first category of subpixel group in the vertical direction; the second subpixel group and the fourth subpixel group are adjacent to the first category of subpixel group in the horizontal direction.

In an embodiment, the first subpixel group may comprise at least one first subpixel unit; the second subpixel group may comprise at least one second subpixel unit; the third subpixel group may comprise at least one third subpixel unit; the fourth subpixel group may comprise at least one fourth subpixel unit.

In an embodiment, the first category of subpixel group may comprise three subpixel units of the first category, the first subpixel group may comprise three first subpixel units, and the third subpixel group may comprise three third subpixel units.

In an embodiment, the first category of subpixel group comprises three subpixel units of the first category, the second subpixel group comprises three second subpixel units, and the fourth subpixel group comprises three fourth subpixel units.

In an embodiment, the subpixel unit which is adjacent to both the first subpixel group and the second subpixel group and/or the subpixel unit which is adjacent to both the first subpixel group and the fourth subpixel group are first subpixel units; the subpixel unit which is adjacent to both the third subpixel group and the fourth subpixel group and/or the subpixel unit which is adjacent to both the third subpixel group and the second subpixel group are third subpixel units; or the subpixel unit which is adjacent to both the first subpixel group and the second subpixel group and/or the subpixel unit which is adjacent to both the first subpixel group and the fourth subpixel group are the first category of subpixel units; the subpixel unit which is adjacent to both the third subpixel group and the fourth subpixel group and/or the subpixel unit which is adjacent to both the third subpixel group and the second subpixel group are the first category of subpixel units.

The embodiment of the present invention further provides an optical grating, wherein an opening area of the optical grating is corresponding to the first category of subpixel group in the array substrate according to anyone of the embodiments mentioned above.

By arranging the optical grating corresponding to the first category of subpixel group, different images can be displayed in different directions. Moreover, since in one direction only an image corresponding to said direction can be viewed, it would not be influenced by images displayed in other directions.

In an embodiment, the opening area of the optical grating may comprise a quadrilateral opening area and/or a hexagonal opening area and/or a quadrilateral opening area with four corners removed.

The embodiment of the present invention further provides a display panel comprising the array substrate according to anyone of the embodiments mentioned above and the optical grating located above the array substrate.

By means of the display panel, different images can be displayed in different directions. Moreover, since in one direction only an image corresponding to said direction can be viewed, it would not be influenced by images displayed in other directions.

A display device is provided by an embodiment of the present invention, which may comprise the above display panel.

By means of the display device, different images can be displayed in different directions. Moreover, since in one direction only an image corresponding to said direction can be viewed, it would not be influenced by images displayed in other directions.

DETAILED DESCRIPTION OF THE INVENTION

The embodiments of the present invention provide an array substrate, an optical grating, a display panel and a display device for displaying different images in different directions according to the arrangement manner of subpixels on the array substrate. Moreover, since in one direction only an image corresponding to this direction can be viewed, it would not be influenced by images displayed in other directions.

The technical solutions in the embodiments of the present invention will be clearly and comprehensively described as follows in combination with the figures in the embodiments of the present invention. Obviously, the described embodiments are just a part of the embodiments of the present invention rather than all of them. On the basis of these described embodiments of the present invention, all the other embodiments as obtained by those ordinarily skilled in the art without spending any inventive effort pertain to the protection scope of the present invention.

The embodiments of the present invention provide an array substrate comprising a plurality of pixel groups, each pixel group may comprise a first category of subpixel groups for displaying a preset gray scale, and a second category of subpixel groups for displaying images of multiple viewpoints.

The first category of subpixel groups may comprise at least one subpixel unit of the first category, and the subpixel units of the first category may display a color such as black, and may also display a preset gray scale.

The second category of subpixel groups may comprise a first subpixel group for displaying a first viewpoint image, a second subpixel group for displaying a second viewpoint image, a third subpixel group for displaying a third viewpoint image, and a fourth subpixel group for displaying a fourth viewpoint image.

The first category of subpixel groups and the second category of subpixel groups may have a mutual positional relationship as follows: the first subpixel group and the third subpixel group are adjacent to the first category of subpixel groups in a vertical direction; the second subpixel group and the fourth subpixel group are adjacent to the first category of subpixel groups in a horizontal direction.

And the first subpixel group may comprise at least one first subpixel unit; the second subpixel group may comprise at least one second subpixel unit; the third subpixel group may comprise at least one third subpixel unit; the fourth subpixel group may comprise at least one fourth subpixel unit.

Around the first category of subpixel group, the subpixel unit which is adjacent to both the first subpixel group and the second subpixel group and/or the subpixel unit which is adjacent to both the first subpixel group and the fourth subpixel group can be first subpixel units; the subpixel unit which is adjacent to both the third subpixel group and the fourth subpixel group and/or the subpixel unit which is adjacent to both the third subpixel group and the second subpixel group can be third subpixel units.

Alternatively, around the first category of subpixel group, the subpixel unit which is adjacent to both the first subpixel group and the second subpixel group and/or the subpixel unit which is adjacent to both the first subpixel group and the fourth subpixel group can be the first category of subpixel units; the subpixel units which is adjacent to both the third subpixel group and the fourth subpixel group and/or the subpixel unit which is adjacent to both the third subpixel group and the second subpixel group can be the first category of subpixel units.

An embodiment of the present invention further provides an optical grating corresponding to the array substrate provided by the embodiments of the present invention. An opening area of the optical grating is corresponding to the first category of subpixel groups of the array substrate. The opening area of the optical grating is a light-transmitting portion of the optical grating. In an embodiment, the center of the first category of subpixel group may coincide with the center of the opening area of the optical grating. Certainly, such coincidence may allow an appropriate error, i.e. a deviation within a certain range may be present between the center of the first category of subpixel group and the center of the opening area of the optical grating. In an embodiment, the size of the opening area of the optical grating may be smaller than the area of the first category of subpixel group, and larger than a half of the area of the first category of subpixel group.

Figure 1A:
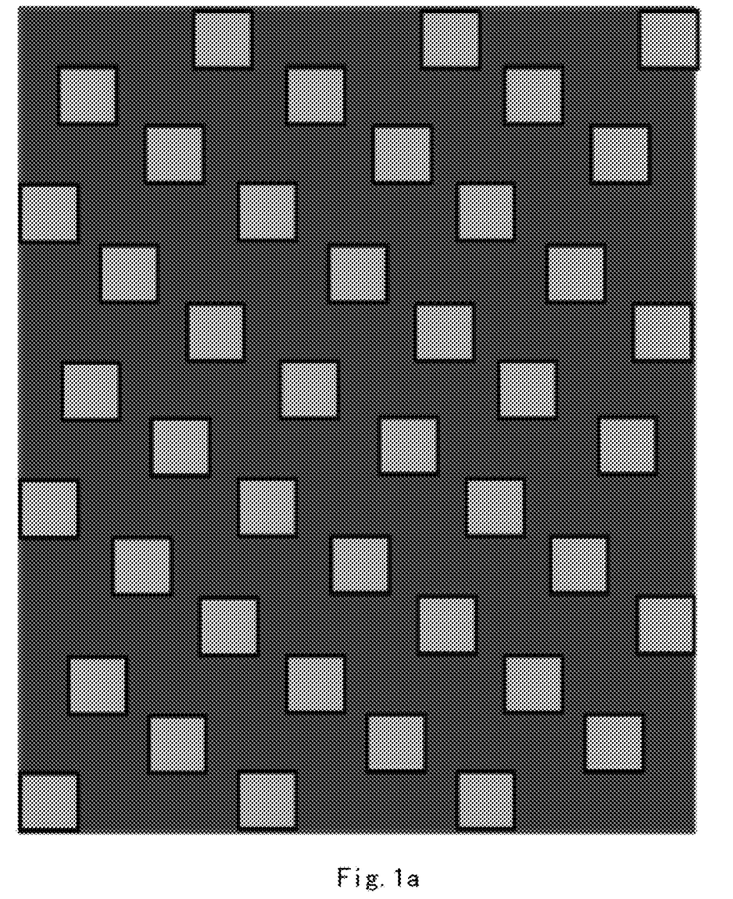
FIG. 1a is a structural schematic diagram of an optical grating as provided by an embodiment of the present invention.
Figure 1B:
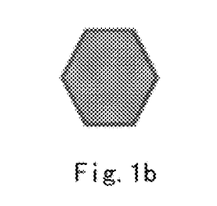
FIG. 1b is a structural schematic diagram of the shape of an optical grating opening as provided by an embodiment of the present invention.
Figures 1C, 2:
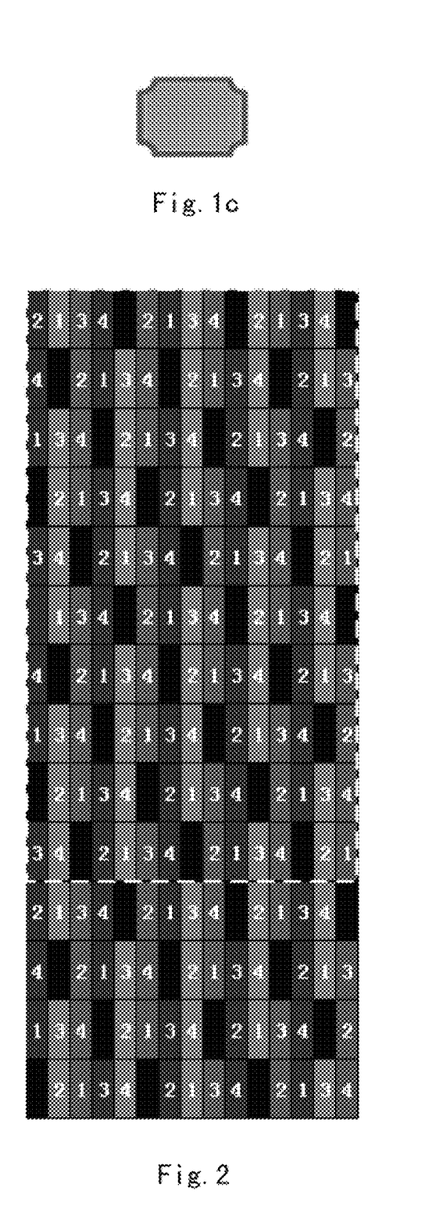
FIG. 1c is a structural schematic diagram of the shape of an optical grating opening as provided by another embodiment of the present invention.
FIG. 2 is a structural schematic diagram of an array substrate as provided by an embodiment of the present invention.

The opening area of the optical grating may be of quadrilateral shape (see, e.g., FIG. 1a); may further have a hexagonal shape (see, e.g., FIG. 1b); may further have the shape of a quadrilateral with four corners removed (see, e.g., FIG. 1c).

The opening area of the optical grating may further comprise multiple combination designs of the patterns mentioned above.

By means of the design of a quadrilateral opening area with four corners removed, some subpixels interfering with sightlines are blocked, thereby reducing image crosstalk at the time of viewing the displayed images in multiple directions.

In the following, embodiments of the array substrate as provided by the present invention will be described in detail in combination with FIGS. 2, 3, 4, 5 and 6, wherein reference number 1 represents a first subpixel unit, reference number 2 represents a second subpixel unit, reference number 3 represents a third subpixel unit, reference number 4 represents a fourth subpixel unit, and black subpixel units represent the first category of subpixel units. The region of the dashed box represents the minimum arrangement cycle of the pixel group of the array substrate, i.e. pixel groups surrounded by the dashed box are arranged on the array substrate successively (from left to right, from top to bottom) and repeatedly, taking the subpixel group surrounded by the dashed frame as one unit.

Referring to FIG. 2, an embodiment of the present invention provides an array substrate comprising a plurality of pixel groups; each pixel group may comprise a first category of subpixel group and a second category of subpixel group; the second category of subpixel group may comprise a first subpixel group, a second subpixel group, a third subpixel group, and a fourth subpixel group. Wherein the first category of subpixel group comprises one subpixel unit of the first category, i.e. one black subpixel unit; the first subpixel group comprises one first subpixel unit, the second subpixel group comprises one second subpixel unit, the third subpixel group comprises one third subpixel unit, and the fourth subpixel group comprises one fourth subpixel unit. Taking the first category of subpixel unit, i.e. a black subpixel unit, as the center, the first subpixel unit, the second subpixel unit, the third subpixel unit and the fourth subpixel unit are arranged in a clockwise direction; wherein the first subpixel unit and the third subpixel unit are located in the vertical direction of the first category of subpixel unit respectively, and the second subpixel unit and the fourth subpixel unit are located in the horizontal direction of the first category of subpixel units respectively.

When the subpixels of the array substrate are arranged in the manner of arrangement of the subpixel units in this embodiment, the minimum arrangement cycle of the pixel groups is that each row comprises fifteen subpixel units, and each column comprises ten subpixel units.

By means of the arrangement of the subpixel units in this embodiment, laminating an optical grating which is designed for the arrangement of these subpixel units, when a display device comprising the array substrate of the present embodiment is placed on a horizontal plane, images displayed by the subpixel groups corresponding to different directions can be seen by means of the optical grating arranged correspondingly in different directions, i.e. a horizontal direction and a vertical direction taking the black subpixel unit as a center. Meanwhile, since the images displayed by the subpixel groups in different directions may be set to be the same or different, different images or the same image can be displayed in different directions. Moreover, since in one direction only an image corresponding to that direction can be viewed, it would not be influenced by images displayed in other directions.

Figure 3:
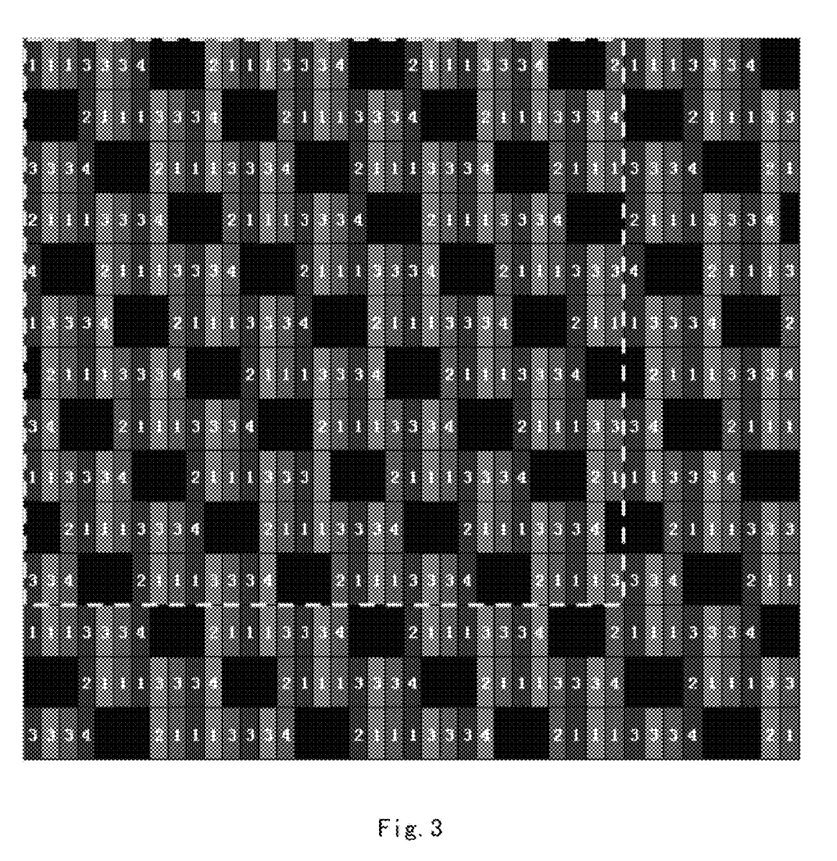
FIG. 3 a structural schematic diagram of an array substrate as provided by another embodiment of the present invention.

Referring to FIG. 3, another embodiment of the present invention provides an array substrate comprising a plurality of pixel groups; each pixel group may comprise a first category of subpixel group and a second category of subpixel group; the second category of subpixel group may comprise a first subpixel group, a second subpixel group, a third subpixel group, and a fourth subpixel group. The first category of subpixel group comprises three subpixel units of the first category, i.e. three black subpixel units. The first subpixel group comprises three first subpixel units, the second subpixel group comprises one second subpixel unit, the third subpixel group comprises three third subpixel units, and the fourth subpixel group comprises one fourth subpixel unit.

Taking the first category of subpixel group, i.e. black subpixel units, as the center, the first subpixel group, the second subpixel group, the third subpixel group and the fourth subpixel group are arranged in a clockwise direction; wherein the first subpixel group and the third subpixel group are located in the vertical direction of the first category of subpixel group respectively, each of the first subpixel units is adjacent to one subpixel unit of the first category, each of the third subpixel units is adjacent to one subpixel unit of the first category; and the second subpixel group and the fourth subpixel group are located in the horizontal direction of the first category of subpixel group respectively; the second subpixel unit is adjacent to the rightmost subpixel unit of the first category in the first category of subpixel group, and the fourth subpixel unit is adjacent to the leftmost subpixel unit of the first category in the first category of subpixel group.

When the subpixels of the array substrate are arranged in the manner of arrangement of the subpixel units in this embodiment, the minimum arrangement cycle of the pixel group is that each row comprises thirty-three subpixel units, and each column comprises eleven subpixel units.

By means of the arrangement of the subpixel units in this embodiment, laminating an optical grating which is designed for the arrangement of these subpixel units, when a display device comprising the array substrate of the present embodiment is placed on a horizontal plane, images displayed by the subpixel groups corresponding to different directions can be seen in different directions by means of the optical grating arranged correspondingly, i.e. a horizontal direction and a vertical direction taking the black subpixel unit as a center. Meanwhile, since the images displayed by the subpixel groups in different directions may be set to be the same or different, different images or the same image can be displayed in different directions. Moreover, since in one direction only an image corresponding to that direction can be viewed, it would not be influenced by images displayed in other directions.

In the case of this embodiment, more than one image can be displayed in the vertical direction, that is, the first subpixel group may comprise subpixel units to which three different viewpoints correspond. For example, the first subpixel group further comprises, in addition to one first subpixel unit, one fifth subpixel unit corresponding to a fifth viewpoint, and one sixth subpixel unit corresponding to a sixth viewpoint; the third subpixel group further comprises, in addition to one third subpixel unit, one seventh subpixel unit corresponding to a seventh viewpoint, and one eighth subpixel unit corresponding to a eighth viewpoint, thereby enabling viewing, in the horizontal direction, an image to which the first viewpoint corresponds, an image to which the third viewpoint corresponds, an image to which the fifth viewpoint corresponds, an image to which the sixth viewpoint corresponds, an image to which the seventh viewpoint corresponds, and an image to which the eighth viewpoint corresponds. However, such manner of arrangement of subpixel units achieves a relatively larger viewing angle in the horizontal direction as compared with the arrangement of subpixel units in the embodiment as shown in FIG. 2.

Figure 4:
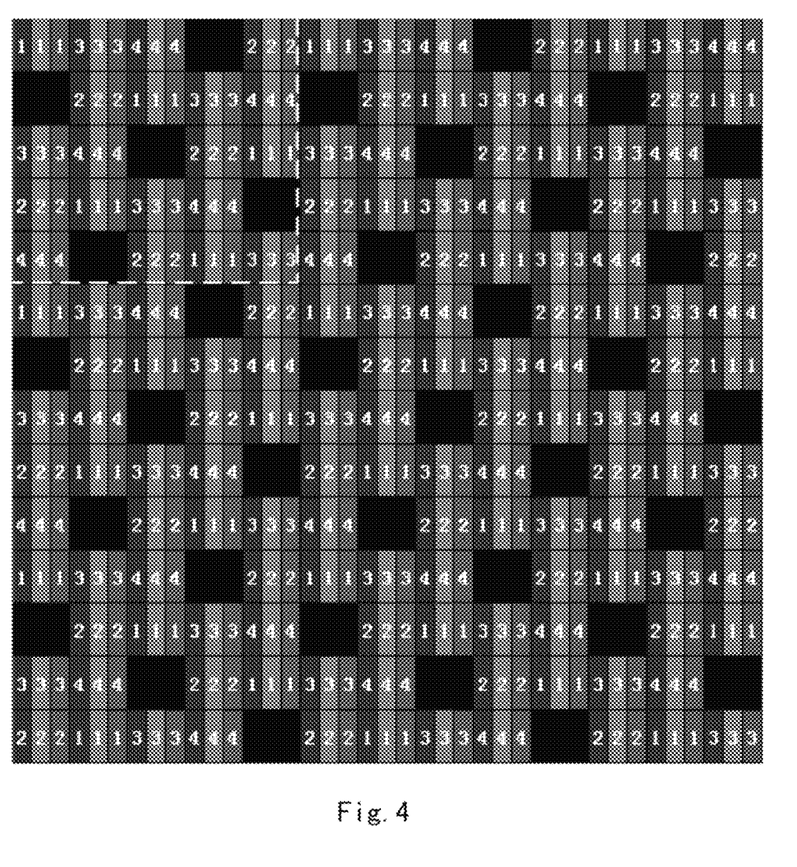
FIG. 4 is a structural schematic diagram of an array substrate as provided by yet another embodiment of the present invention.

Referring to FIG. 4, another embodiment of the present invention provides an array substrate comprising a plurality of pixel groups; each pixel group comprises a first category of subpixel group and a second category of subpixel group; the second category of subpixel group comprises a first subpixel group, a second subpixel group, a third subpixel group, and a fourth subpixel group. The first category of subpixel group comprises three subpixel units of the first category, i.e. three black subpixel units. The first subpixel group comprises three first subpixel units, the second subpixel group comprises three second subpixel units, the third subpixel group comprises three third subpixel units, and the fourth subpixel group comprises three fourth subpixel units.

Taking the first category of subpixel group, i.e. black subpixel units, as the center, the first subpixel group, the second subpixel group, the third subpixel group and the fourth subpixel group are arranged in a clockwise direction; wherein the first subpixel group and the third subpixel group are located in the vertical direction of the first category of subpixel group respectively; and each of the first subpixel units is adjacent to one subpixel unit of the first category respectively, each of the third subpixel units is adjacent to one subpixel unit of the first category respectively; the second subpixel group and the fourth subpixel group are located in the horizontal direction of the first category of subpixel group respectively; one of the three second subpixel units is adjacent to the rightmost subpixel unit of the first category in the first category of subpixel group, and one of the three fourth subpixel units is adjacent to the leftmost subpixel unit of the first category in the first category of subpixel group.

When the subpixels of the array substrate are arranged in the manner of arrangement of the subpixel units in this embodiment, the minimum arrangement cycle of the pixel group is that each row comprises fifteen subpixel units, and each column comprises five subpixel units.

By means of the arrangement of the subpixel units in this embodiment, when a display device comprising the array substrate of the present embodiment is placed on a horizontal plane, it can display different images or the same image in different directions. Moreover, since in one direction only an image corresponding to that direction can be viewed, it would not be influenced by images displayed in other directions.

In the case of the embodiment shown in FIG. 3, the first subpixel group, the second subpixel group, the third subpixel group and the fourth subpixel group can all comprise subpixel units to which three different viewpoints correspond. For example, the first subpixel group further comprises, in addition to one first subpixel unit, one fifth subpixel unit corresponding to a fifth viewpoint, and one sixth subpixel unit corresponding to a sixth viewpoint; the third subpixel group further comprises, in addition to one third subpixel unit, one seventh subpixel unit corresponding to a seventh viewpoint, and one eighth subpixel unit corresponding to a eighth viewpoint; the second subpixel group further comprises, in addition to one second subpixel unit, one ninth subpixel unit corresponding to a ninth viewpoint, and one tenth subpixel unit corresponding to a tenth viewpoint; the fourth subpixel group further comprises, in addition to one fourth subpixel unit, one eleventh subpixel unit corresponding to an eleventh viewpoint, and one twelfth subpixel unit corresponding to a twelfth viewpoint, thereby enabling viewing, in the horizontal direction, an image to which the first viewpoint corresponds, an image to which the third viewpoint corresponds, an image to which the fifth viewpoint corresponds, an image to which the sixth viewpoint corresponds, an image to which the seventh viewpoint corresponds, and an image to which the eighth viewpoint corresponds, and viewing, in the vertical direction, an image to which the second viewpoint corresponds, an image to which the fourth viewpoint corresponds, an image to which the ninth viewpoint corresponds, an image to which the tenth viewpoint corresponds, an image to which the eleventh viewpoint corresponds, and an image to which the twelfth viewpoint corresponds. However, such arrangement of subpixel units achieves a relatively larger viewing angle in the vertical direction for the second and fourth subpixel groups as compared with the manner of arrangement of subpixel units in the embodiment as shown in FIG. 3.

Figure 5:
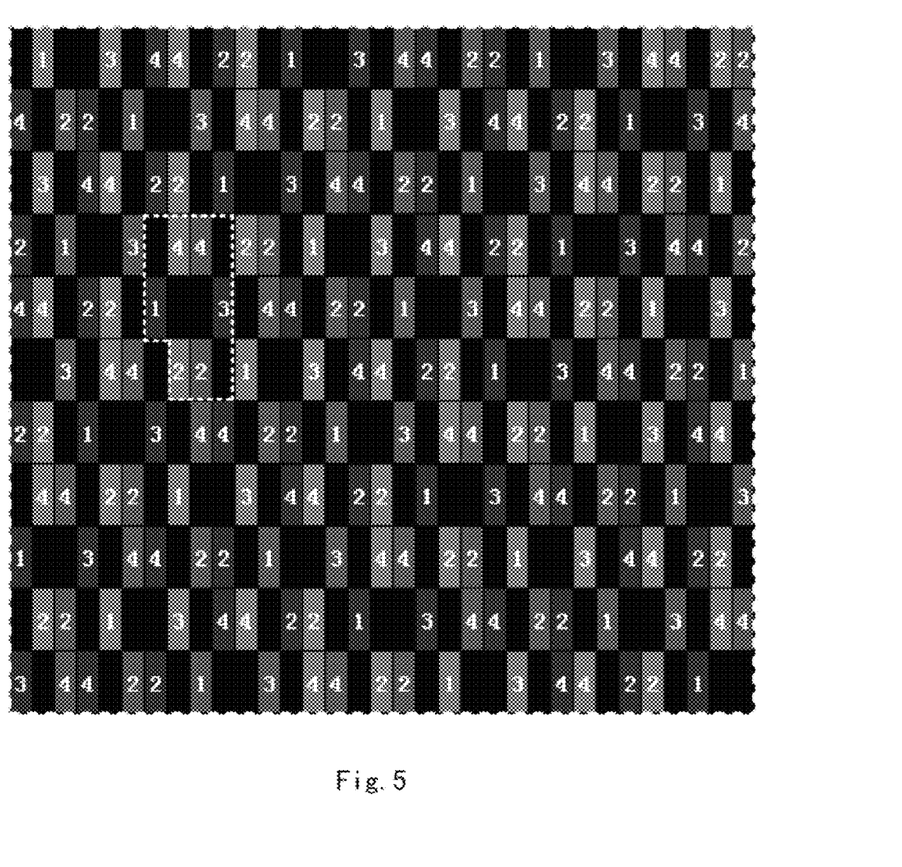
FIG. 5 is a structural schematic diagram of an array substrate as provided by yet another embodiment of the present invention.

Referring to FIG. 5, another embodiment of the present invention provides an array substrate comprising a plurality of pixel groups; each pixel group comprises a first category of subpixel group and a second category of subpixel group; the second category of subpixel group comprises a first subpixel group, a second subpixel group, a third subpixel group, and a fourth subpixel group. The first category of subpixel group may at least comprise two adjacent subpixel units of the first category, i.e. two adjacent black subpixel units. The first subpixel group comprises one first subpixel unit, the second subpixel group comprises two second subpixel units, the third subpixel group comprises one third subpixel unit, and the fourth subpixel group comprises two fourth subpixel units.

Taking the two adjacent subpixel units of the first category, i.e. black subpixel units, as the center, the first subpixel group, the second subpixel group, the third subpixel group and the fourth subpixel group are arranged in a anti-clockwise direction; wherein, the first subpixel group and the third subpixel group are located in the horizontal direction of the two adjacent subpixel units of the first category respectively, and one first subpixel unit is adjacent to the left subpixel unit of the first category in the two adjacent subpixel units of the first category, and one third subpixel unit is adjacent to the right subpixel unit of the first category; the second subpixel group and the fourth subpixel group are located in the vertical direction of the two adjacent subpixel units of the first category respectively, and each of the second subpixel units is adjacent to one subpixel unit of the first category respectively, and each of the fourth subpixel units is adjacent to one subpixel unit of the first category respectively. Moreover, around the two adjacent subpixel units of the first category, the subpixel unit which is adjacent to both the first subpixel group and the second subpixel group is set as the first category of subpixel unit, and the subpixel unit which is adjacent to both the third subpixel group and the fourth subpixel group is set as the first category of subpixel unit, i.e. the subpixel units at the top right corner and those at the bottom left corner of the two adjacent subpixel units of the first category are both set as the first category of subpixel units. Meanwhile, the subpixel unit which is adjacent to both the first subpixel group and the fourth subpixel group is set as the first category of subpixel unit, and the subpixel unit which is adjacent to both the third subpixel group and the second subpixel group is set as the first category of subpixel unit.

As shown in FIG. 5, when the pixels of the array substrate are arranged in the manner of arrangement of the subpixel units in this embodiment, the pixel group is repeated according to the minimum unit surrounded by the dashed box as shown in FIG. 5. The minimum unit comprises two adjacent subpixel units of the first category, one first subpixel unit and one third subpixel unit which are arranged at two sides of the two adjacent subpixel units of the first category in the horizontal direction, two fourth subpixel units and two second subpixel units which are arranged at two sides of the two adjacent subpixel units of the first category in the vertical direction, one subpixel unit of the first category which is adjacent to the first and fourth subpixel units, one subpixel unit of the first category which is adjacent to the third and fourth subpixel units, and one subpixel unit of the first category which is adjacent to the second and third subpixel units.

By means of the arrangement of the subpixel units in this embodiment, when a display device comprising the array substrate of the present embodiment is placed on a horizontal plane, it can display different images or the same image in different directions. Moreover, since in one direction only an image corresponding to that direction can be viewed, it would not be influenced by images displayed in other directions. Furthermore, since the top right corner, the top left corner, the bottom right corner and the bottom left corner of the two adjacent subpixel units of the first category are respectively added with one subpixel unit of the first category, wherein the first category of subpixel units only display brightness instead of displaying viewpoint images, image crosstalk at the time of viewing the displayed imaged in multiple directions may be reduced.

Figure 6:
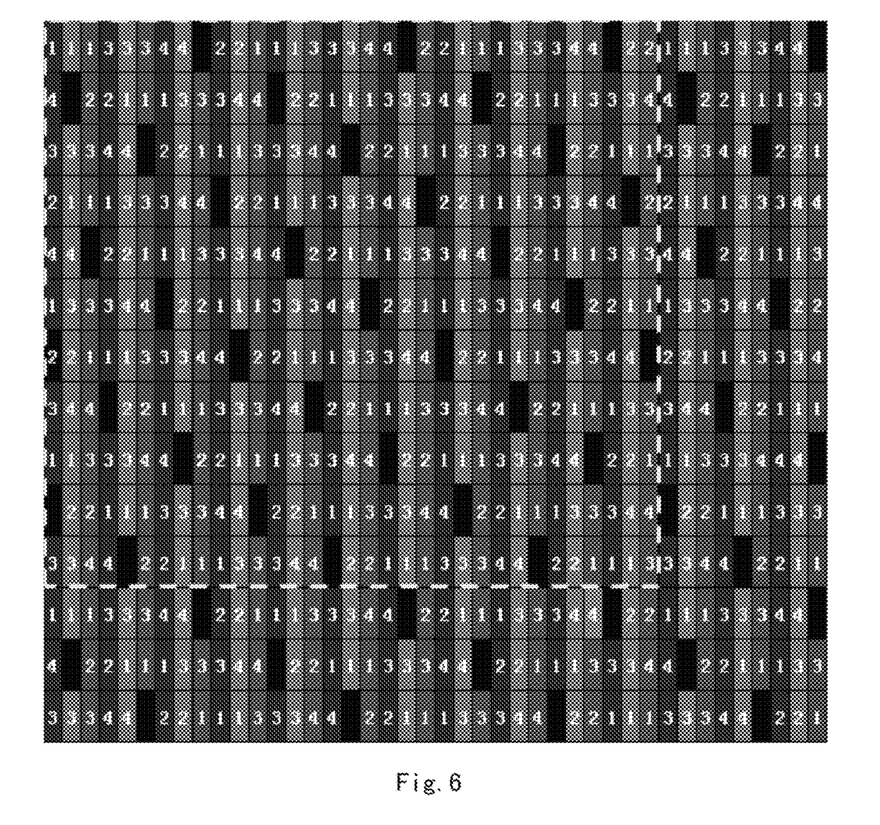
FIG. 6 is a structural schematic diagram of an array substrate as provided by yet another embodiment of the present invention.

Referring to FIG. 6, another embodiment of the present invention provides an array substrate comprising a plurality of pixel groups; each pixel group comprises a first category of subpixel group and a second category of subpixel group; the second category of subpixel group comprises a first subpixel group, a second subpixel group, a third subpixel group, and a fourth subpixel group. The first category of subpixel group comprises one subpixel unit of the first category, i.e. one black subpixel unit. The first subpixel group comprises one first subpixel unit, the second subpixel group comprises two second subpixel units, the third subpixel group comprises one third subpixel unit, and the fourth subpixel group comprises two fourth subpixel units;

Taking the subpixel unit of the first category, i.e. black subpixel unit, as the center, the first subpixel group, the second subpixel group, the third subpixel group and the fourth subpixel group are arranged in a clockwise direction; wherein, the first subpixel group and the third subpixel group are located in the vertical direction of the first category of subpixel group respectively; the second subpixel group and the fourth subpixel group are located in the horizontal direction of the first category of subpixel group respectively; the two second subpixel units are adjacent to the subpixel units of the first category in the first category of subpixel group, and the two fourth subpixel units are adjacent to the subpixel units of the first category in the first category of subpixel group. Moreover, the subpixel unit which is adjacent to both the first subpixel group and the second subpixel group is set as a first subpixel unit, the subpixel unit which is adjacent to both the first subpixel group and the fourth subpixel group is set as a first subpixel unit, the subpixel unit which is adjacent to both the third subpixel group and the second subpixel group is set as a third subpixel unit, and the subpixel unit which is adjacent to both the third subpixel group and the fourth subpixel group is set as a third subpixel unit. Namely, the two sides of the first subpixel unit are respectively added with one first subpixel unit in the horizontal direction, and the two sides of the third subpixel unit are respectively added with one third subpixel unit in the horizontal direction.

When the pixels of the array substrate are arranged in the manner of arrangement of the subpixel units in this embodiment, the minimum arrangement cycle of the pixel group is that each row comprises thirty-three subpixel units, and each column comprises eleven subpixel units.

By means of the arrangement of the subpixel units in this embodiment, when a display device comprising the array substrate of the present embodiment is placed on a horizontal plane, it can display different images or the same image in different directions. Moreover, since in one direction only an image corresponding to that direction can be viewed, it would not be influenced by images displayed in other directions. Furthermore, since the two sides of the first subpixel unit of each subpixel group are respectively added with one first subpixel unit in the horizontal direction, and the two sides of the third subpixel unit are respectively added with one third subpixel unit in the horizontal direction, image crosstalk at the time of viewing the displayed imaged from the first viewpoint and the third viewpoint can be reduced.

The array substrate as provided by the present invention is not limited to above embodiments enumerated hereinbefore. Variants from these described embodiments of the present invention also belong to the contents of the present invention.

In order to better understand the change in viewing angles and color cast for different viewpoint images in the respective embodiments, detailed description will be completed as follows in combination with FIGS. 7, 8 and 9 by taking the change in the viewing angles and color cast for the second viewpoint image and the fourth viewpoint image in the embodiments as an example.

Figure 7:
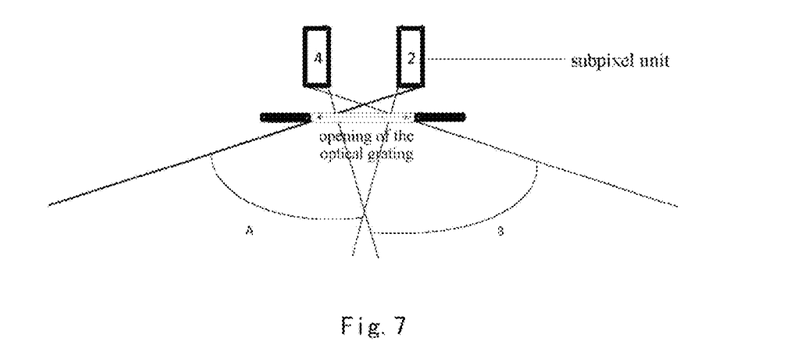
FIG. 7 is a schematic diagram of viewing angles for the second viewpoint and the fourth viewpoint in case where each subpixel group comprises one second subpixel unit and one fourth subpixel unit in the embodiments of the present invention.
Figure 8:
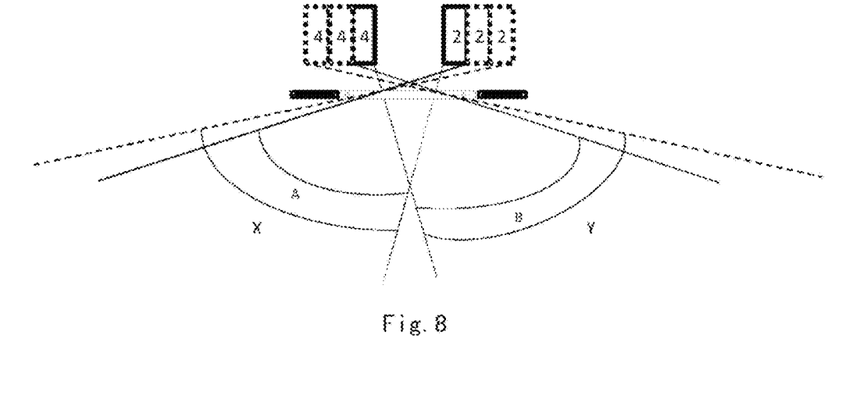
FIG. 8 is a schematic diagram of viewing angles for the second viewpoint and the fourth viewpoint in the case where each subpixel group comprises three second subpixel units and three fourth subpixel units in the embodiments of the present invention.

As compared with FIG. 7, each subpixel group in FIG. 8 is added with two subpixel units, i.e. the second subpixel group is added with two second subpixel units, and the fourth subpixel group is added with two fourth subpixel units. Therefore, the viewing angle for the second viewpoint image in FIG. 7 is the angle marked by full lines, i.e. angle A, while the viewing angle for the second viewpoint image in FIG. 8 is an angle X. The viewing angle for the fourth viewpoint image in FIG. 7 is the angle marked by full lines, i.e. angle B, while the viewing angle for the fourth viewpoint image in FIG. 8 is an angle Y. From this it can be known that, since there is an increase in the number of the second subpixel units in each subpixel group, the viewing angle for the second viewpoint image in the vertical direction also increases accordingly.

Figure 9:
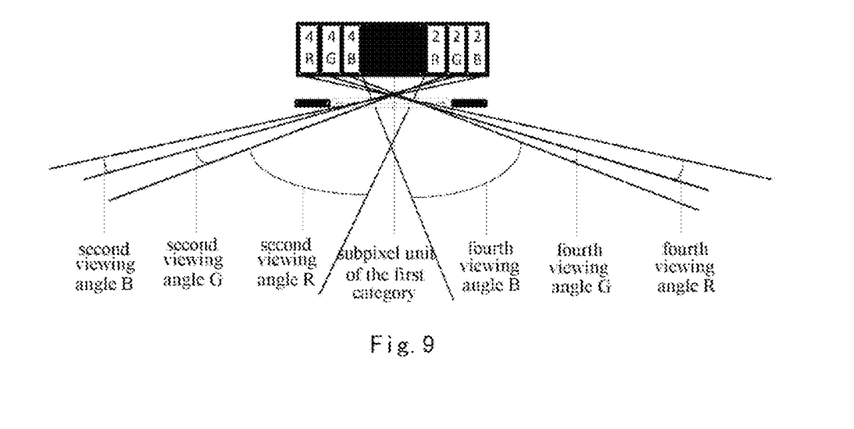
FIG. 9 is a schematic diagram illustrating aggravation of color cast for the second viewpoint and the fourth viewpoint when each subpixel group comprises three second subpixel units and three fourth subpixel units in the embodiments of the present invention.

Referring to the arrangement of subpixel units in FIG. 9, the second subpixel group comprises three second subpixel units, wherein, a second subpixel unit close to the subpixel unit of the first category, i.e. black subpixel unit, displays a red color R, and from left to right there are a second subpixel unit displaying a green color G and a second subpixel unit displaying a blue color B successively. According to the manner of arrangement of subpixel units in FIG. 9, in the R part of the second viewing angle, the image of the second viewpoint as viewed is the second subpixel unit displaying R. However, according to the manner of arrangement of subpixel units in FIG. 7, in light of the cycle arrangement of red, green and blue (i.e. RGB), the second subpixel units displaying different colors (i.e. red R, green G and blue B) would be viewed in the range of viewing angle A. Therefore, compared to the image as displayed at the second viewpoint in FIG. 7, the color cast of the image viewed from the second viewpoint in FIG. 9 is aggravated. Likewise, as compared with the image as viewed from the fourth viewpoint in FIG. 7, the color cast of the image viewed from the fourth viewpoint in FIG. 9 is also aggravated. From this it can be known that, each subpixel group in the embodiment shown in FIG. 3 comprises three first subpixel units and three third subpixel units, that is, each comprises two more first subpixel units and two more third subpixel units compared to the embodiment shown in FIG. 2, thus the viewing angles for the first viewpoint image and the third viewpoint image are increased, and the color cast thereof are aggravated as compared with the embodiment shown in FIG. 2. Since each subpixel group in the embodiment shown in FIG. 4 comprises three first subpixel units, three second subpixel units, three third subpixel units and three fourth subpixel units, the viewing angles for the images of the four viewpoints are increased, and the color cast thereof are also aggravated as compared with the embodiment shown in FIG. 1.

In summary, along with the increase in the number of first subpixel units in each subpixel group, the viewing angle for the first viewpoint image may become larger, and the color cast thereof is more serious. On the contrary, along with the decrease in the number of first subpixel units in each subpixel group, the viewing angle for the first viewpoint image may become smaller, and the color cast thereof is less serious.

Likewise, along with the increase in the number of second subpixel units in each subpixel group, the viewing angle for the second viewpoint image may become larger, and the color cast thereof may become more serious. On the contrary, along with the decrease in the number of second subpixel units in each subpixel group, the viewing angle for the second viewpoint image may become smaller, and the color cast thereof may become less serious.

Along with the increase in the number of third subpixel units in each subpixel group, the viewing angle for the third viewpoint image may become larger, and the color cast thereof is more serious. On the contrary, along with the decrease in the number of third subpixel units in each subpixel group, the viewing angle for the third viewpoint image may become smaller, and the color shift thereof is less serious.

Along with the increase in the number of fourth subpixel units in each subpixel group, the viewing angle for the fourth viewpoint image may become larger, and the color cast thereof may be more serious. On the contrary, along with the decrease in the number of fourth subpixel units in each subpixel group, the viewing angle for the fourth viewpoint image may become smaller, and the color shift thereof is less serious.

In addition, it can be understood from FIG. 9 more clearly that the respective embodiments of the present invention can achieve the function of displaying different images in different directions. The image 2 displayed at the second viewpoint and the image 4 displayed at the fourth viewpoint may be different images. When a display device comprising the array substrate according to the embodiments of the present invention is placed on the horizontal plane, taking the first category of subpixel units as the center, from different viewpoints at left and right sides in the horizontal direction, images displayed by the subpixel groups corresponding to a direction within the viewing angle can be viewed, i.e. different images can be displayed.

Figure 10:
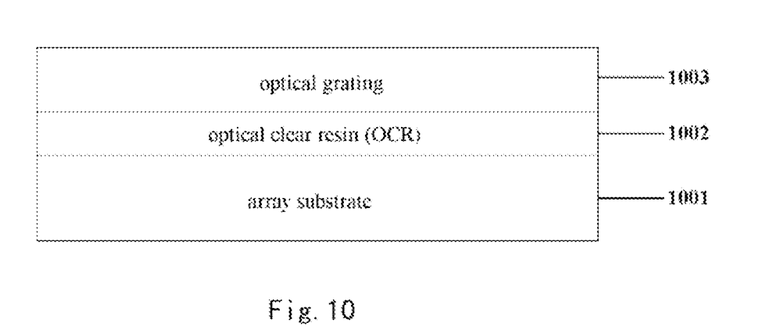
FIG. 10 is a sectional schematic diagram of a display panel as provided by an embodiment of the present invention.

Referring to FIG. 10, an embodiment of the present invention further provides a display panel corresponding to the array substrate and the optical grating as provided by the embodiments of the present invention. Said display panel may comprise an array substrate 1001 as provided by one of the above embodiments, a optical grating 1003 located above the array substrate, and an optical clear resin (OCR) 1002 for adhering the array substrate 1001 and the optical grating 1003.

An embodiment of the present invention further provides a display device corresponding to the display panel as provided by the embodiment of the present invention, comprising the display panel according to FIG. 10. The display device can be a liquid crystal display or a plasma display.

Figure 11:
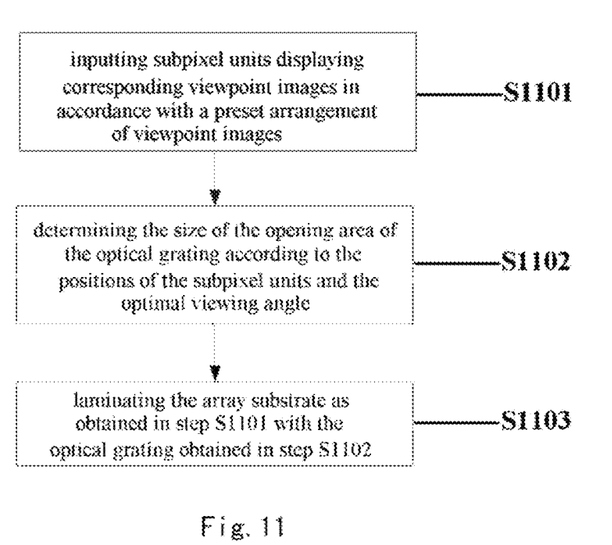
FIG. 11 is a flow chart of a method for multi-view display as provided by an embodiment of the present invention.

Referring to FIG. 11, an embodiment of the present invention provides a method for multi-view display, said method may comprise steps as follows.

S1101: inputting subpixel units displaying corresponding viewpoint images in accordance with a preset arrangement of viewpoint images.

Figure 12:
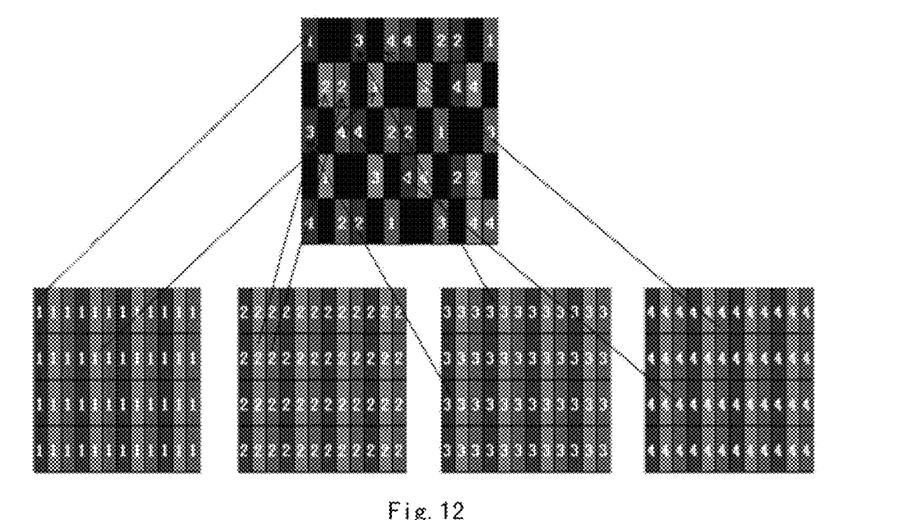
FIG. 12 schematically shows corresponding positional relationships between subpixels of four given views and subpixels of a composite view to be obtained according to one embodiment of the present invention.

Herein, this step is explained concisely by taking the arrangement of viewpoint images to which FIG. 5 corresponds as an example. For example, as shown in FIG. 12, in order to obtain the viewpoint images as shown in FIG. 5, as for the four given views as shown in the lower part of FIG. 12, it is possible to first write the four views into an FPGA plate, and encode and sort the subpixels of the views according to the correspondence as shown by the arrows in FIG. 12. If they are videos, it is possible to first write 1-n frame pictures into the FPGA, and then perform encoding and sorting. The image/video information as obtained by re-sorting/encoding is provided to a time-sequence controller (T-con), thereby controlling normal display of the display device. In the image/video as obtained by synthesis of subpixels from different views, the gray scale values of the corresponding subpixels are from the gray scale values of the corresponding positions (subpixels) in the view/video after synthesis, respectively. For example, as for the embodiment as shown in FIG. 12, in the composite view as shown in the upper part of FIG. 12, the gray scale value of the first subpixel unit 1 is corresponding to the gray scale value of the first subpixel unit 1 in the first view as shown in the lower part of FIG. 12, etc. The black subpixel units of the first category may be black frames.

S1102: determining the size of the opening area of the optical grating according to the positions of the subpixel units and the optimal viewing angle, wherein the optical grating may be a solid-state barrier optical grating, and/or active barrier optical grating, and/or lenticular optical grating and/or electronic liquid crystal lens(ELC).

Figure 13:
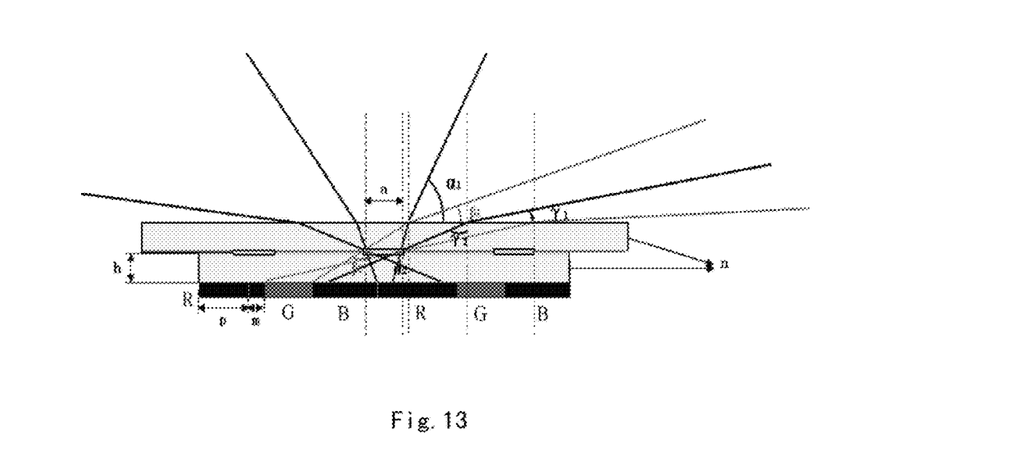
FIG. 13 schematically shows an optical path of light from the viewpoint image of the array substrate to the external side of the optical grating according to one embodiment of the present invention.

The process of determining the size of the opening area of the optical grating is explained as follows by virtue of FIG. 13. FIG. 13 schematically shows an optical path of light from the viewpoint image of the array substrate to the external side of the optical grating according to one embodiment of the present invention. In the embodiment as shown in FIG. 13, it shows, from left to right, a subpixel unit displaying red R, a subpixel unit displaying green G and a subpixel unit displaying blue B in the array substrate. The subpixel units of the first category may be present between the adjacent subpixel units. FIG. 13 shows a width "a" of an opening area of the optical grating, and shows optical paths of light which comes from the respective subpixel units (R, G, B) and exits by refraction after passing through the optical grating opening and the light-transmitting layer (e.g. optical clear resin). According to this figure, the following equations may be obtained:

$$\mathrm{Sin}(90°-\alpha_1)=n \sin \alpha_2 \tan \alpha_2=(a-m)/2h \qquad \text{Equation (1)}$$

$$\mathrm{Sin}(90°-\beta_1)=n \sin \beta_2 \tan \beta_2=(3m+2p-a)/2h \qquad \text{Equation (2)}$$

$$\mathrm{Sin}(90°-\gamma_1)=n \sin \gamma_2 \tan \gamma_2=(2p+m+a)2h \qquad \text{Equation (3)}$$

wherein p is a width of each subpixel unit; h is a height where the optical grating is placed, i.e. the distance from the optical grating to the array substrate; n is a refractive index of the light-transmitting layer; a is a width of the opening area of the optical grating, m is a width of the subpixel unit of the first category; $\alpha_1$ is an angle between the horizontal direction and the light that exits by refraction at the light-transmitting layer after passing through the edge of the optical grating opening area and comes from the red (R) subpixel unit; $\alpha_2$ is an incident angle for the light refraction at the light-transmitting layer, which light is from the red (R) subpixel unit and passes through the edge of the optical grating opening; $\beta_1$ is an angle between the horizontal direction and the light that exits by refraction at the light-transmitting layer after passing through the edge of the optical grating opening area and comes from the green (G) subpixel unit; $\beta_2$ is an incident angle for the light refraction at the light-transmitting layer, which light is from the green (G) subpixel unit and passes through the edge of the optical grating opening; $\gamma_1$ is an angle between the horizontal direction and the light that exits by refraction at the light-transmitting layer after passing through the edge of the optical grating opening area and comes from the blue (B) subpixel unit; $\gamma_2$ is an incident angle for the light refraction at the light-transmitting layer, which light is from the blue (B) subpixel unit and passes through the edge of the optical grating opening.

Appropriate $\alpha_1$, $\beta_1$ and $\gamma_1$ are set according to the positions of the subpixel units and the optimal viewing angle, by which can determine the size of the opening area of the optical grating. In one embodiment, al is determined as large as possible, and β1 and γ1 are determined as small as possible, in order to obtain a viewing angle as large as possible in the vertical direction.

Figure 14:
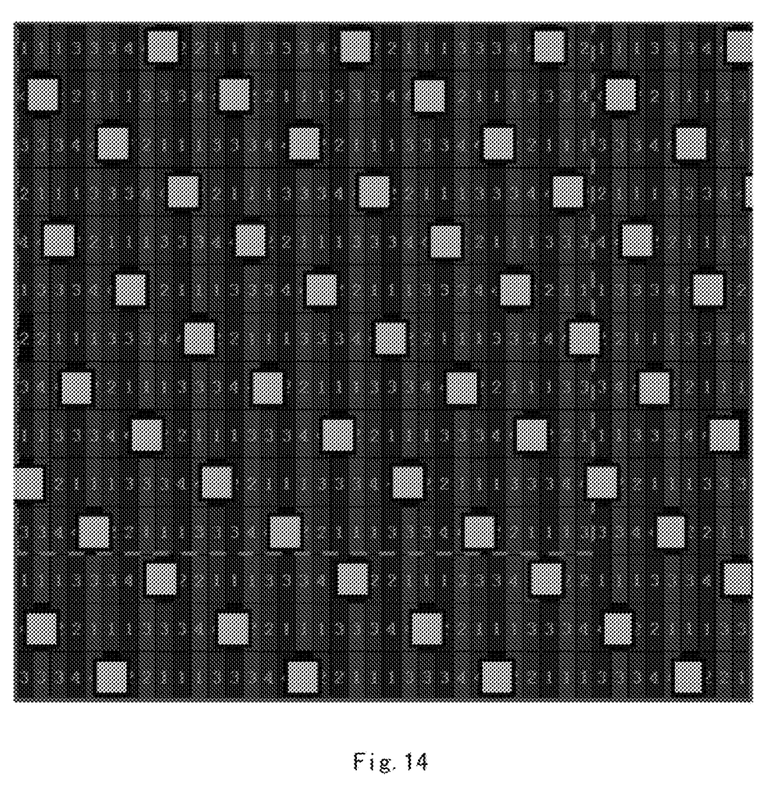
FIG. 14 is a structural schematic diagram of a display panel as provided by an embodiment of the present invention.

S1103: laminating the array substrate as obtained in step S1101 with the optical grating obtained in step S1102. FIG. 14 shows the effect after lamination, i.e. the effect after the lamination of the array substrate according to the embodiment shown in FIG. 6.

In conclusion, embodiments of the present invention provide an array substrate, an optical grating, a display panel and a display device, which enables displaying different images or the same image in different directions. Moreover, since in one direction only an image corresponding to said direction can be viewed, it would not be influenced by images displayed in other directions. The viewing angles for the viewpoint images in different directions can be increased by enabling each subpixel group to comprise a plurality of subpixel units for displaying multiple viewpoint images. The image crosstalk phenomenon at the time of viewing the displayed images in different directions may be reduced by adding to each subpixel group a subpixel unit of the first category which only displays brightness instead of displaying the viewpoint image.

Obviously, those skilled in the art can make various modifications and variations to the embodiments of the present invention without departing from the spirit and scope of the present invention. In this way, if said modifications and variations to the embodiments of the present invention fall within the scopes of the claims of the present invention and equivalent techniques thereof, the present invention also intends to include such modifications and variations.

The invention claimed is:

1. An array substrate comprising a plurality of pixel groups, each pixel group comprising:
   a first category of subpixel group for displaying a preset gray scale;
   and a second category of subpixel group for displaying images of multiple viewpoints,
   wherein the second category of subpixel group is located around the first category of subpixel group and arranged in different directions,
   wherein the second category of subpixel group is configured to display images for different viewpoints.

2. The array substrate according to claim 1, wherein the first category of subpixel group comprises at least one subpixel unit of the first category.

3. The array substrate according to claim 2, wherein the second category of subpixel group comprises a first subpixel group for displaying a first viewpoint image, a second subpixel group for displaying a second viewpoint image, a third subpixel group for displaying a third viewpoint image, and a fourth subpixel group for displaying a fourth viewpoint image.

4. The array substrate according to claim 3, wherein the first subpixel group and the third subpixel group are adjacent to the first category of subpixel group in a vertical direction; the second subpixel group and the fourth subpixel group are adjacent to the first category of subpixel group in a horizontal direction.

5. The array substrate according to claim 4, wherein the first subpixel group comprises at least one first subpixel unit; the second subpixel group comprises at least one second subpixel unit; the third subpixel group comprises at least one third subpixel unit; the fourth subpixel group comprises at least one fourth subpixel unit.

6. The array substrate according to claim 5, wherein the first category of subpixel group comprises three subpixel units of the first category, the first subpixel group comprises three first subpixel units, and the third subpixel group comprises three third subpixel units.

7. The array substrate according to claim 6, wherein the second subpixel group comprises three second subpixel units, and the fourth subpixel group comprises three fourth subpixel units.

8. The array substrate according to claim 5, wherein around the first category of subpixel group, the subpixel unit which is adjacent to both the first subpixel group and the second subpixel group and/or the subpixel unit which is adjacent to both the first subpixel group and the fourth subpixel group are first subpixel units; the subpixel units which is adjacent to both the third subpixel group and the fourth subpixel group and/or the subpixel unit which is adjacent to both the third subpixel group and the second subpixel group are third subpixel units; or around the first category of subpixel group, the subpixel unit which is adjacent to both the first subpixel group and the second subpixel group and/or the subpixel unit which is adjacent to both the first subpixel group and the fourth subpixel group are the first category of subpixel units; the subpixel unit which is adjacent to both the third subpixel group and the fourth subpixel group and/or the subpixel unit which is adjacent to both the third subpixel group and the second subpixel group are the first category of subpixel units.

9. An optical grating comprising an opening area, wherein the opening area is corresponding to a first category of subpixel group in an array substrate, the array substrate comprising a plurality of pixel groups, wherein each pixel group comprises the first category of subpixel group for displaying a preset gray scale, and a second category of subpixel group for displaying images of multiple viewpoints, wherein the second category of subpixel group is located around the first category of subpixel group and arranged in different directions.

10. The optical grating according to claim 9, wherein the first category of subpixel group comprises at least one subpixel unit of the first category.

11. The optical grating according to claim 10, wherein the second category of subpixel group comprises a first subpixel group for displaying a first viewpoint image, a second subpixel group for displaying a second viewpoint image, a third subpixel group for displaying a third viewpoint image, and a fourth subpixel group for displaying a fourth viewpoint image.

12. The optical grating according to claim 11, wherein the first subpixel group and the third subpixel group are adjacent to the first category of subpixel group in a vertical direction; the second subpixel group and the fourth subpixel group are adjacent to the first category of subpixel group in a horizontal direction.

13. The optical grating according to claim 9, wherein the opening area of the optical grating comprises a quadrilateral opening area and/or a hexagonal opening area and/or a quadrilateral opening area with four corners removed.

14. The optical grating according to claim 9, wherein the center of the opening area of the optical grating coincides with the center of the first category of subpixel group.

15. A display panel, comprising an array substrate and an optical grating located above the array substrate, the array substrate comprising a plurality of pixel groups, each pixel group comprising a first category of subpixel group for displaying a preset gray scale, and a second category of subpixel group for displaying images of multiple viewpoints, wherein the second category of subpixel group is located around the first category of subpixel group and arranged in different directions,
wherein an opening area of the optical grating is corresponding to the first category of subpixel group in the array substrate.

16. The display panel according to claim 15, wherein the first category of subpixel group comprises at least one subpixel unit of the first category and wherein the opening area of the optical grating comprises a quadrilateral opening area and/or a hexagonal opening area and/or a quadrilateral opening area with four corners removed.

17. The display panel according to claim 16, wherein the second category of subpixel group comprises a first subpixel group for displaying a first viewpoint image, a second subpixel group for displaying a second viewpoint image, a third subpixel group for displaying a third viewpoint image, and a fourth subpixel group for displaying a fourth viewpoint image.

18. The display panel according to claim 17, wherein the first subpixel group and the third subpixel group are adjacent to the first category of subpixel group in a vertical direction; the second subpixel group and the fourth subpixel group are adjacent to the first category of subpixel group in a horizontal direction, and wherein the center of the opening area of the optical grating coincides with the center of the first category of subpixel group.

19. The display panel according to claim 18, wherein the first subpixel group comprises at least one first subpixel unit; the second subpixel group comprises at least one second subpixel unit; the third subpixel group comprises at least one third subpixel unit; the fourth subpixel group comprises at least one fourth subpixel unit.

20. A display device, comprising the display panel according to claim 15.

* * * * *